(12) United States Patent
Levesque

(10) Patent No.: US 8,689,670 B2
(45) Date of Patent: *Apr. 8, 2014

(54) COMPOSITE MATERIAL, COMPOSITE PART AND METHODS FOR MAKING SUCH

(75) Inventor: Martin Levesque, Lachenais (CA)

(73) Assignee: Hutchinson Aerospace & Industry Limited, Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,175

(22) Filed: Jul. 3, 2012

(65) Prior Publication Data

US 2012/0295046 A1    Nov. 22, 2012

Related U.S. Application Data

(63) Continuation of application No. 12/766,035, filed on Apr. 23, 2010, now Pat. No. 8,302,522.

(60) Provisional application No. 61/172,924, filed on Apr. 27, 2009.

(51) Int. Cl.
*D04C 1/06* (2006.01)

(52) U.S. Cl.
USPC ............................................................ 87/13

(58) Field of Classification Search
USPC .................................. 87/1, 7, 9, 13
See application file for complete search history.

(56) References Cited

U.S. PATENT DOCUMENTS

| | | | |
|---|---|---|---|
| 2,162,598 A | 6/1939 | Atwood | |
| 5,052,446 A | 10/1991 | Gysin | |
| 5,229,177 A | 7/1993 | Craven et al. | |
| 5,766,724 A | 6/1998 | Tailor et al. | |
| 6,655,253 B2 | 12/2003 | Uchida et al. | |
| 7,013,787 B2 | 3/2006 | Shimizu | |
| 8,302,522 B2 * | 11/2012 | Levesque | 87/13 |
| 2002/0069750 A1 | 6/2002 | Uchida et al. | |
| 2004/0237760 A1 | 12/2004 | Shimizu | |
| 2005/0089707 A1 * | 4/2005 | Obeshaw | 428/593 |
| 2005/0284562 A1 | 12/2005 | Frantz et al. | |
| 2006/0057331 A1 * | 3/2006 | Lucas | 428/117 |
| 2006/0103050 A1 | 5/2006 | Bergsma et al. | |
| 2006/0236544 A1 | 10/2006 | Huskamp et al. | |

FOREIGN PATENT DOCUMENTS

| | | |
|---|---|---|
| EP | 0265890 | 5/1988 |
| EP | 781953 | 7/1997 |
| EP | 1384565 | 1/2004 |

(Continued)

OTHER PUBLICATIONS

European Patent Office, The European Search Report, May 17, 2011, 7p.

*Primary Examiner* — Shaun R Hurley
(74) *Attorney, Agent, or Firm* — Benoît & Côté Inc.

(57) ABSTRACT

A composite material comprising a plurality of fiber tape strips woven or braided together. Each of the plurality of fiber tape strips is made of a single layer of unidirectional fibers. The fibers are at least partially embedded in a thermoplastic matrix. A tubular composite part is made from this composite material and of an internal film. A method of manufacturing the composite material comprises weaving or braiding the fiber tape strips, especially in the form of a tube. A method of manufacturing a composite part comprises pressurizing the film inside the tube while heating both the tube and the film up to their forming temperature so as to bond the film to the woven fiber tape strips.

17 Claims, 11 Drawing Sheets

(56) References Cited

FOREIGN PATENT DOCUMENTS

| | | |
|---|---|---|
| EP | 1388407 | 10/2006 |
| EP | 1394462 | 10/2006 |
| EP | 1264717 | 12/2012 |
| GB | 1080552 | 8/1967 |
| WO | WO 9959802 | 11/1999 |

* cited by examiner

COMPOSITE MATERIAL, COMPOSITE PART AND METHODS FOR MAKING SUCH

CROSS REFERENCE TO RELATED APPLICATIONS

This application is a continuation of U.S. Non-Provisional application Ser. No. 12/667,035 which claims priority from U.S. Provisional Application No. 61/172,924, both of which are incorporated herein by reference in their entirety.

FIELD OF THE INVENTION

The present invention generally relates to the field of composite materials. More specifically, the invention relates to a composite material, a composite part and methods for making such where the composite material is made of woven or braided fiber tape strips.

BACKGROUND OF THE INVENTION

Composite materials find an ever increasing place in the construction of aircrafts. Composite parts made from such materials have to meet stringent requirements, such as those related to fire, smoke and toxicity while being as light as possible while still being sufficiently stiff for their application. Moreover, it does not hurt if the part is as cheap as possible. Such is the case of air ventilation ducts used inside an aircraft.

Typically, such parts are made of thermoset composite materials, which are quite labor intensive to manufacture, and consequently expensive. Furthermore, because these parts need to be made from many pieces of composite material overlapping one another, the part is relatively heavy. Thermoplastics that come in sheets have slowly made their place in this market. Typically, the sheets are cut, heated and formed in two halves which are later bonded together. Again, although a bit less work intensive than working with thermoset composite materials, this process still requires a fair amount of labor. Although often lighter than their thermoset counterparts, there is always a competition to manufacture the lightest part in the market.

There is therefore a need for a part made from a composite material that is lighter and ideally also less labor intensive to manufacture than existing composite parts.

SUMMARY OF THE INVENTION

It is an object of the present invention to provide a composite part made from a composite material that overcomes or mitigates one or more disadvantages of known composite parts, or at least provides a useful alternative.

The invention provides the advantages of allowing the manufacture of very light tubular composite parts.

For the sake of simplicity in the following description, the term braid or braided will be used to describe a material or part that is made by interlacing two or more sets of tows that intersect at any angle (they angle may be either an acute, an obtuse or a right angle).

In accordance with an embodiment of the present invention, there is provided a composite material comprising a plurality of fiber tape strips braided together. Each of the plurality of fiber tape strips is made of a single layer of unidirectional fibers. The fibers are at least partially embedded in a thermoplastic matrix.

Optionally, the fiber tape strips may be braided so as to form a tube.

In accordance with another embodiment of the present invention, there is provided a composite part made from a material comprising a plurality of fiber tape strips braided together so as to form a tubular structure. Each of the plurality of fiber tape strips are made of a single layer of unidirectional fibers which are at least partially embedded in a thermoplastic matrix.

Optionally, the composite part may comprise a thermoplastic film on its inside. The film is bonded to the fiber tape strips.

Optionally, the composite part may comprise a plurality of voids devoid of fiber tape strips. The voids are filled by the film.

Optionally, the composite part may be supplied with an inflated balloon inside the tubular structure to provide support to the tubular structure and prevent the fiber tape strips from cracking under a squeezing load.

In accordance with yet another embodiment of the present invention, there is provided a method of making a composite material comprising the step of braiding together a plurality of fiber tape strips where each of the fiber tape strips is made of a single layer of unidirectional fibers and where the fibers are at least partially embedded in a thermoplastic matrix.

Optionally, the method may involve braiding the fiber tape strips so as to form a tube.

In accordance with still another embodiment of the present invention, there is provided a method of manufacturing a composite part. The method comprises pressurizing a film inside a tube made from a composite material while heating both the tube and the film up to their forming temperature so as to bond the film to a plurality of braided fiber tape strips comprised in the tube. Each fiber tape strip is made of a single layer of unidirectional fibers which as at least partially embedded in a thermoplastic matrix.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a composite material and to a part made of composite material that uses braided strips of fiber tape imbedded in a thermoplastic matrix.

Figure 1:
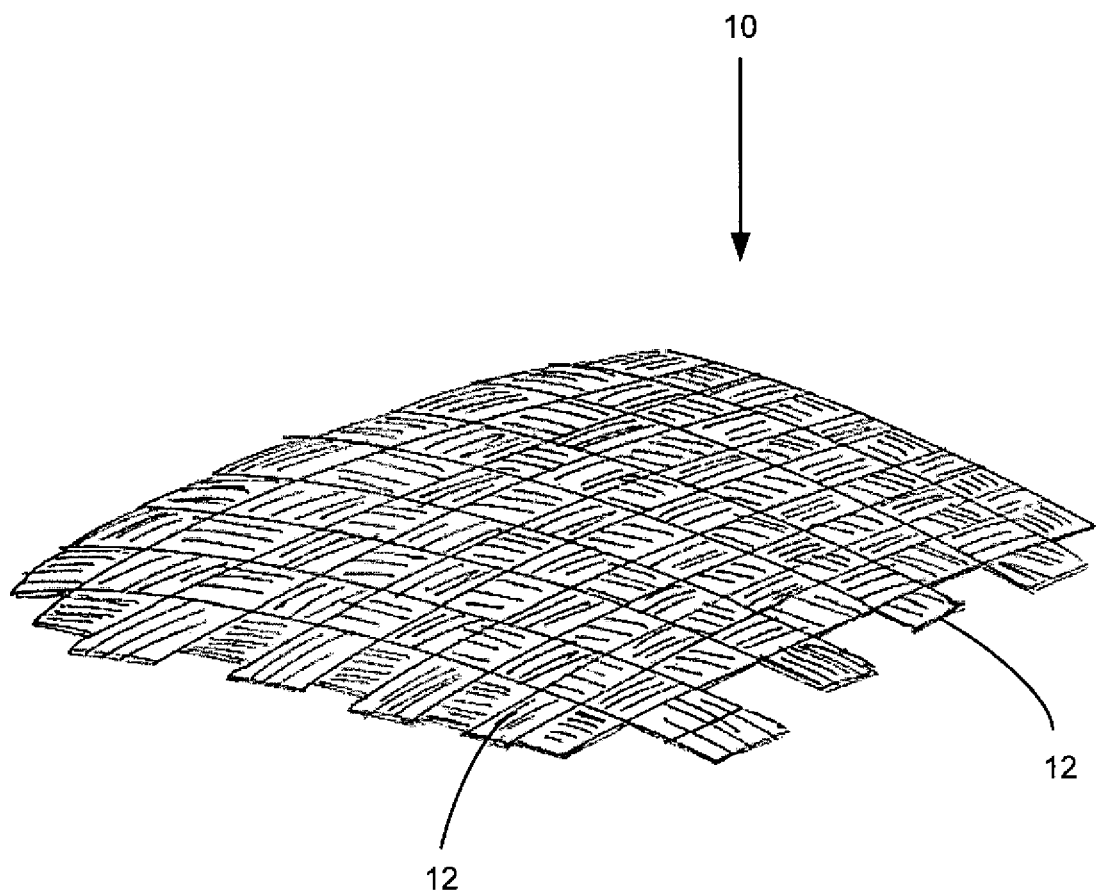
FIG. 1 is an axonometric view of a composite material made from a plurality of braided fiber tape strips in accordance with an embodiment of the present invention.

Turning now to FIG. 1, there is depicted a composite material 10 that is made of a plurality of fiber tape strips 12 that are braided together. The resulting composite material 10 has fibers oriented in to different directions. In FIG. 1 the fiber tapes strips are oriented in different degrees of configuration ranging from 20° to 80°.

Figure 2:
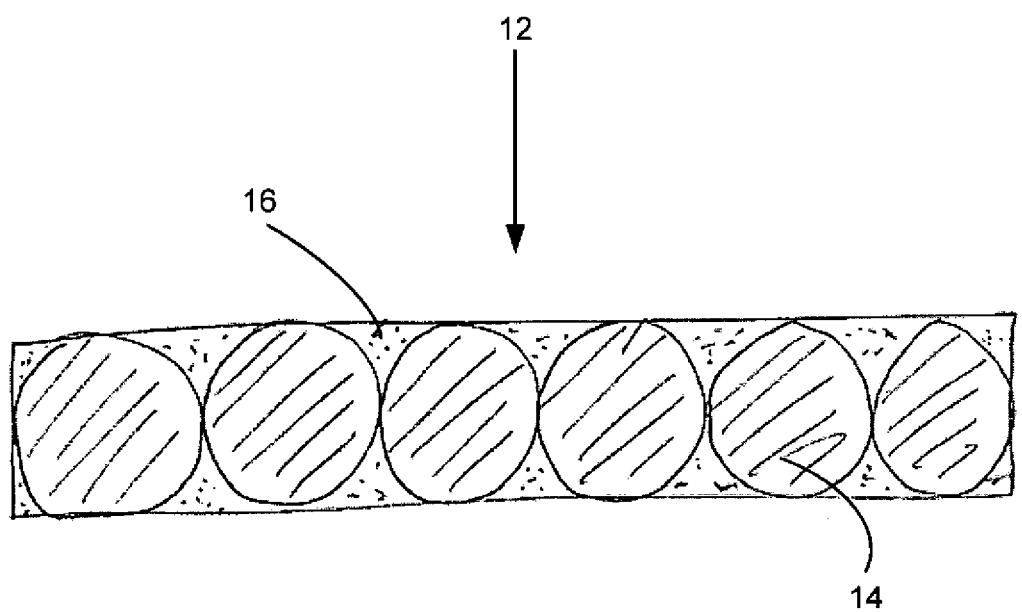
FIG. 2 is a cross-sectional view of one fiber tape strip of the composite material of FIG. 1.

FIG. 2, which depicts a cross-section view of one fiber tape strip 12, is concurrently referred to. Each fiber tape strip 12 is made of a single layer of unidirectional fibers 14 at least partially embedded in a thermoplastic matrix 16. All the conventional types of fibers may be used as the fiber 14, namely glass, carbon, aramid and other known or future fibers. Similarly, many different types of thermoplastic matrix may be used. However, for specific applications such as aircraft ventilation ducts, it has been found that using either cyanathester, polyphenylene sulfide, polyetherimide or polyamide provided adequate results that met the requirements of the FAR 25.856 specification for aircrafts. Although the fiber tape strips 12 may be made of different width, they are typically made in strips that are narrower than 4 inches (101.6 millimeters) and more particularly narrower than 0.75 inch (19.05 millimeters).

Figure 3:
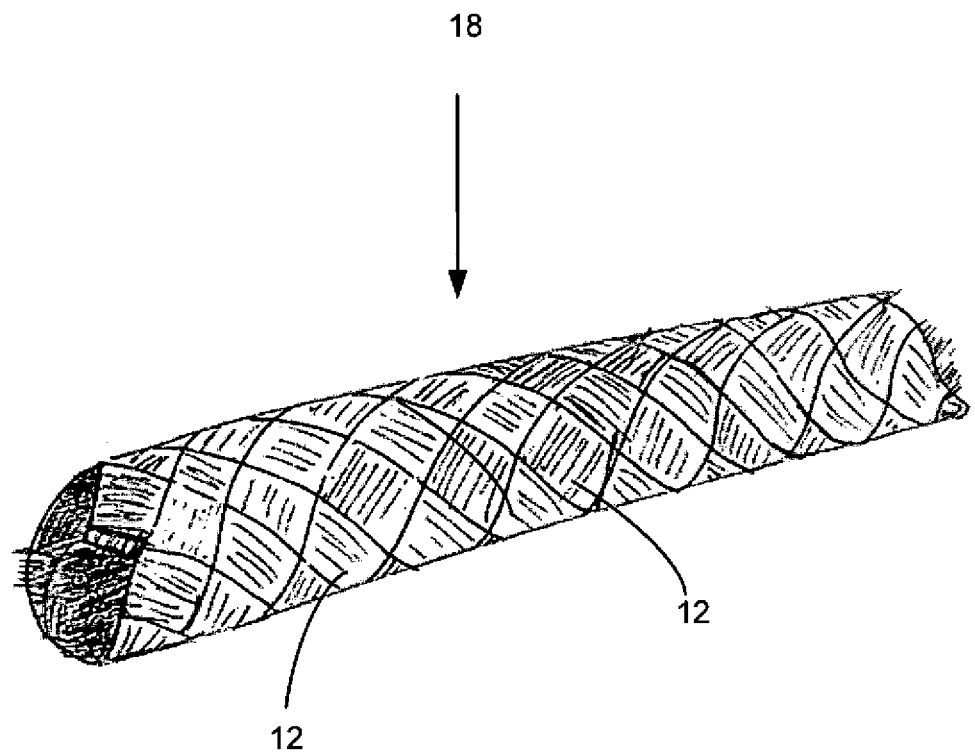
FIG. 3 is an axonometric view of the composite material of FIG. 1 braided so as to make a tube.
Figure 4:
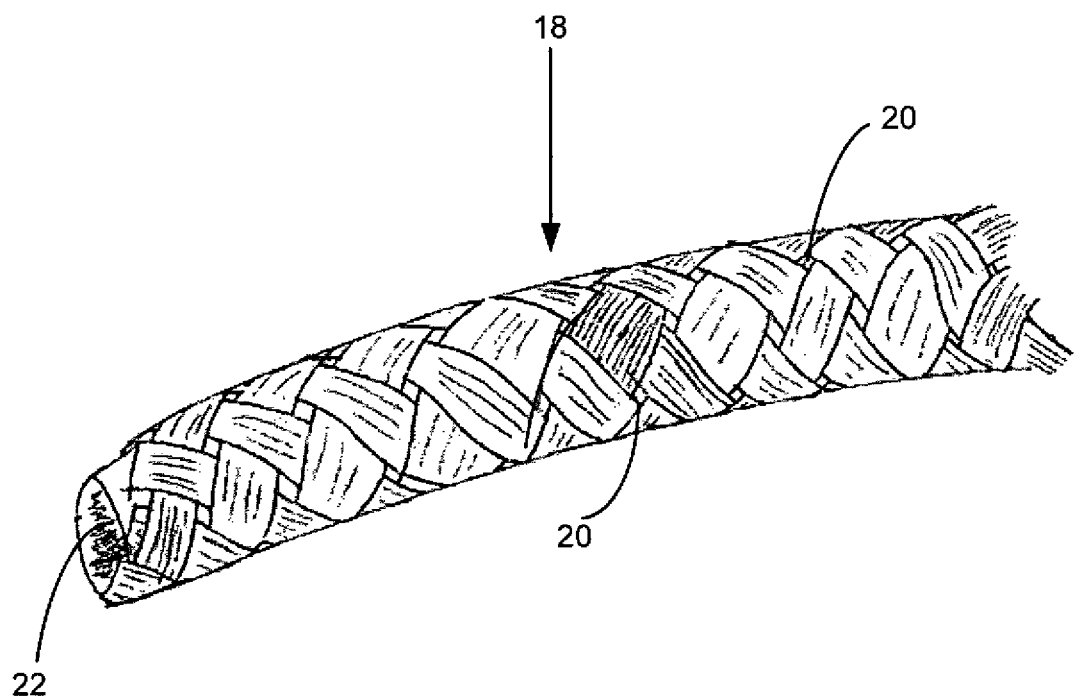
FIG. 4 is an axonometric view of the tube of FIG. 3 but where the fiber tape strips are braided more loosely to have some voids.

FIG. 3 is now referred to. In this figure, many thermoplastic fiber tape strips 12 are braided on a braiding loom so as to form a tube 18. The braiding process used to manufacture such a tube 18 is basically the same as for braiding a tube made of standard yarns of fibers. The braiding process may be adjusted so as to produce a tube that is braided more or less tightly. For example, the tube 18 may be braided loosely so as to produce a tube having some voids 20 in it, as shown in FIG. 4 now concurrently referred to.

Optionally, the tube 18 may be provided with a thermoplastic film 22 inside. The film 22 is made of a material that is compatible with the material used for the matrix 16. For example, for aircraft applications, the film 22 may be made of polyphenylene sulfide, polyetherimide or polyamide, which are all thermoplastics or cyanathester thermoset.

Figure 5:
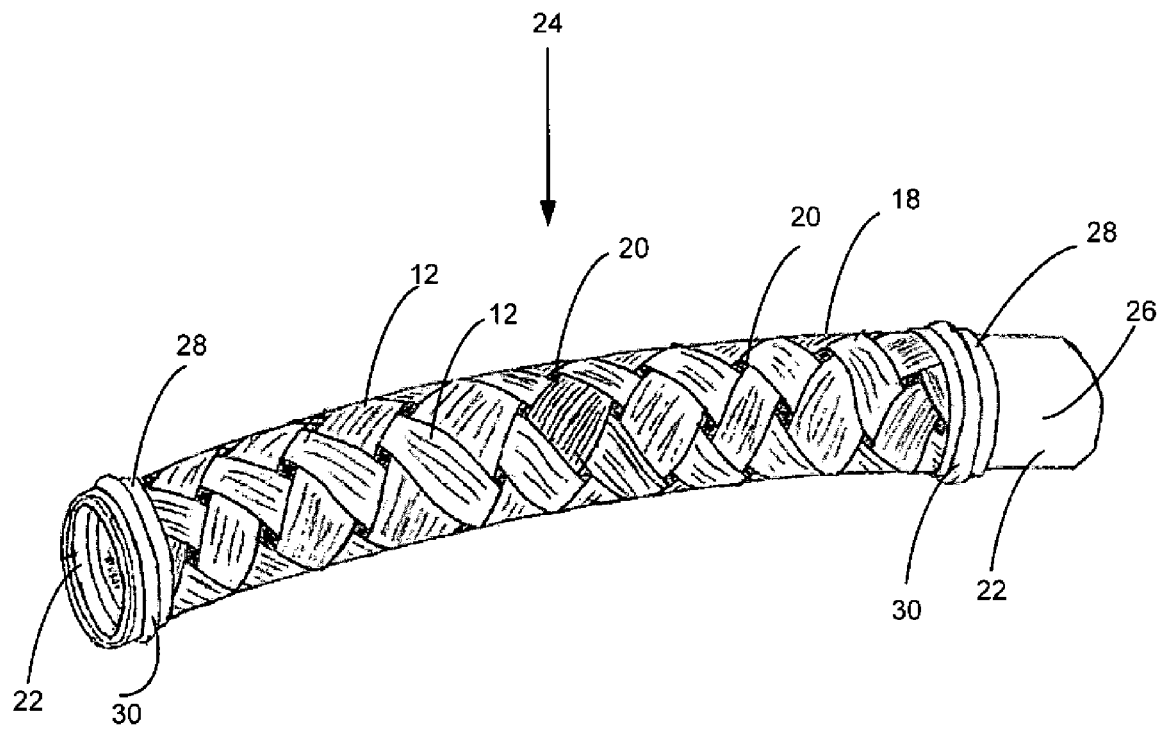
FIG. 5 is an axonometric view of a composite part (braided loosely to have some voids) made from the tube of FIG. 4.

The film 22 is especially useful when the tube 18 is used to manufacture a composite part 24 having a tubular structure, as depicted in FIG. 5, such as a ventilation duct for an aircraft. Since the weight of aircraft components is always of the utmost importance, the composite part 24 may be made of the tube 18 where voids 20 are present. Hence, by braiding the tube 18 more loosely, it is possible to use just the minimum amount of reinforcement, i.e. the quantity of fiber tape strips 12, in the tube 18 to create the composite part 24 having the required physical properties. The film 22 is used to seal the inside of the composite part 24 and to fill the voids 20, such that the composite part 24 may be used as a ventilation duct. An extending portion 26 of the film 22 may extend from the composite part 24. Although not shown in the embodiment of FIG. 5, one extending portion 26 of the film 22 may extend from each extremity of the composite part 24.

The composite part 24 may be equipped with peripheral bands 28 affixed to an exterior of the tube 18 and placed in proximity to the extremities of the tube 18 so that the bands 28 prevent the fiber tape strips 12 from cracking by adhering to them and providing a reinforcement structure that can withstand a radial load. Each band 28 is actually made of another fiber tape strip 12 wrapped around each extremity of the tube 18 and consolidated to the fiber tape strips 12 using heat during the forming process. The bands 28 may further be deformed during the forming process to create beads 30, which are local circumferential bosses running all around each band 28. These beads 28 are a well-known feature of similar tubular parts and are used when connecting one tubular part to another tubular part or, as in the present case, one composite part 24 to and adjacent composite part 24. A connector is typically used to connect one tubular part to the adjacent tubular part. Such connector is typically made of silicon. The composite parts are held together when the connector is stretched over the beads of the two adjacent tubular parts and clamps or tie-wraps are placed behind each bead so the connector is prevented from disconnecting. This way of assembling two tubular composite parts together is well known in the art.

Figure 6:
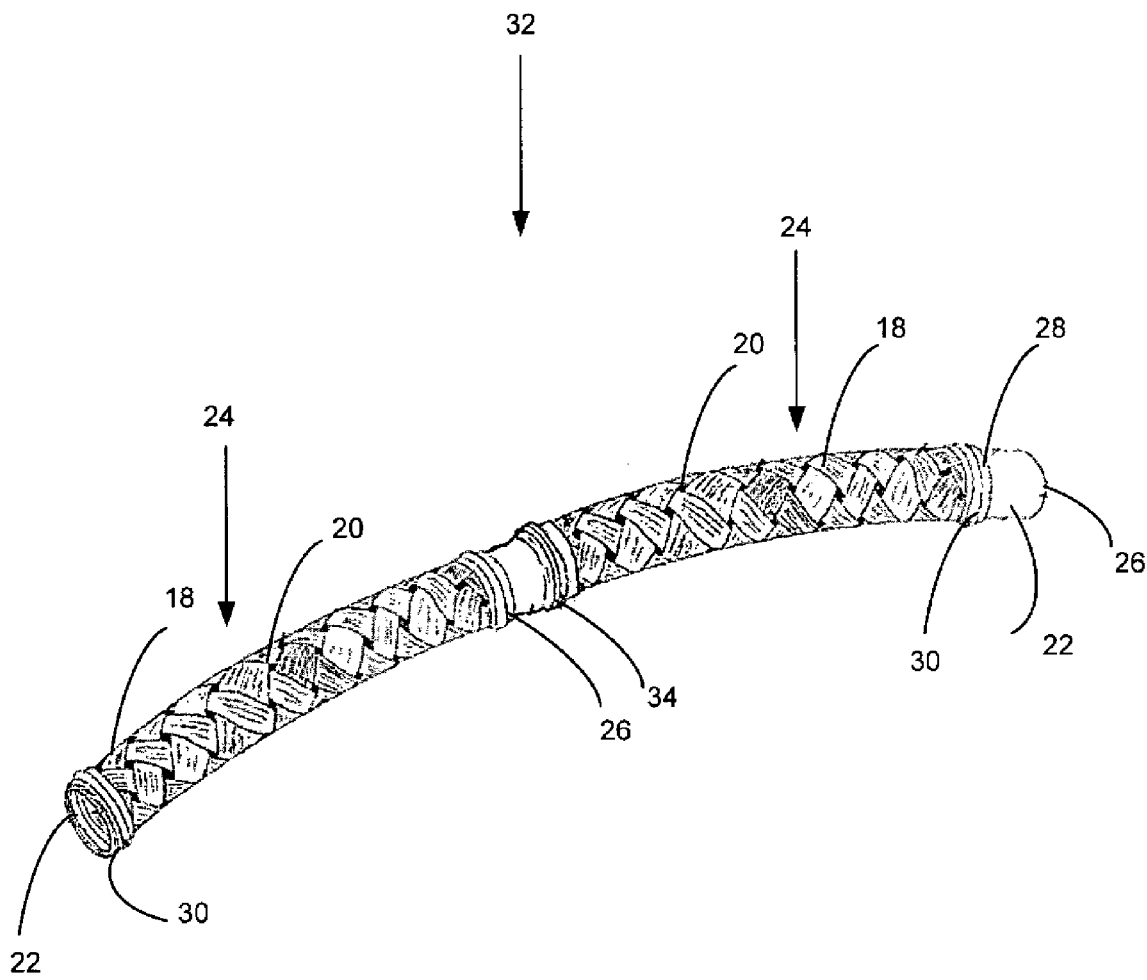
FIG. 6 is an axonometric view of a duct (braided loosely to have some voids) made from an assembly of two composite parts of FIG. 5.

FIG. 6, now referred to, depicts a ventilation duct 32 made from the assembly of two composite parts 24. Instead of being assembled with the help of a connector, the two adjacent composite parts 24 are connected together using the extending portion 26 of the film 22. Indeed, the extending portion 26 replaces the known connector by basically acting as a connector that is integrally provided with the composite part 24. The extending portion 30 of the film 22 may be stretched over the bead 28 of the adjacent composite part 24 and locked into place by a clamp or a tie-wrap 34, much in the same fashion a known connector would be locked into place. If the extending portion 30 of the film 22 is not required (for example, if a known connector is used), it may simply be cut flush with the extremity of the composite part 24.

Figure 7:
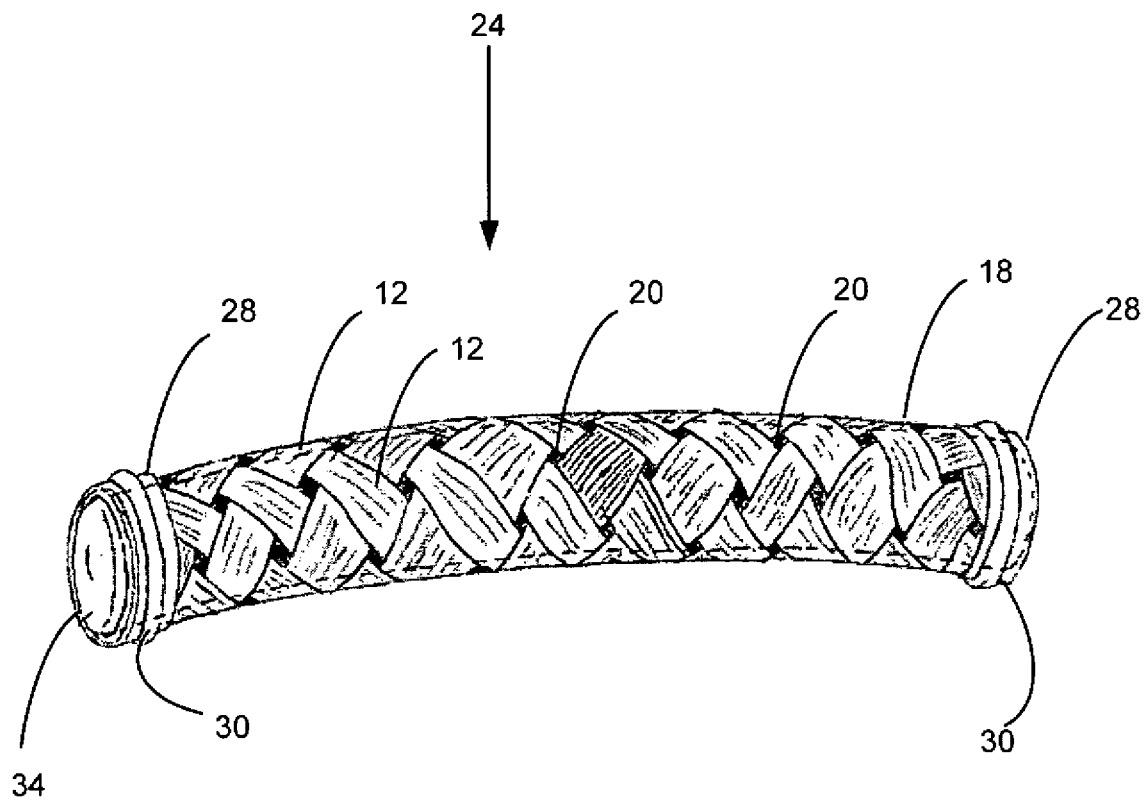
FIG. 7 is an axonometric view of the composite part of FIG. 5 (braided loosely to have some voids) showing an inner balloon used during installation of the composite part.

FIG. 7 is now referred to. The composite parts 24 of the present invention are typically installed in aircrafts as ventilation ducts. In such installations, space is scarce and access is cumbersome. Because the composite parts 24 are made as light as possible, it happens that they get damaged during installation because the installers squeezed them too much and they crack. The composite part 24 then becomes useless and must be discarded. To prevent such wasted material, an inner balloon 34 is provided inside the composite part 24 for the installation. The inner balloon 34, inflated to a low pressure, provides sufficient radial support to the fiber tape strips 12 so that they do not deform over their limit when squeezed into place during installation. The inner balloon 34 therefore prevents the fiber tape strips 12 from snapping and breaking when squeezed. Once the composite part 24 is installed in the aircraft, the inner balloon 34 may be deflated and reused or may be burst, removed and discarded. For example, the inner balloon 34 may be cheaply made from two polyethylene films welded together and cut to match the interior shape of the composite part 24. The cutting operation may be done simultaneously to the welding operation.

Figure 8:
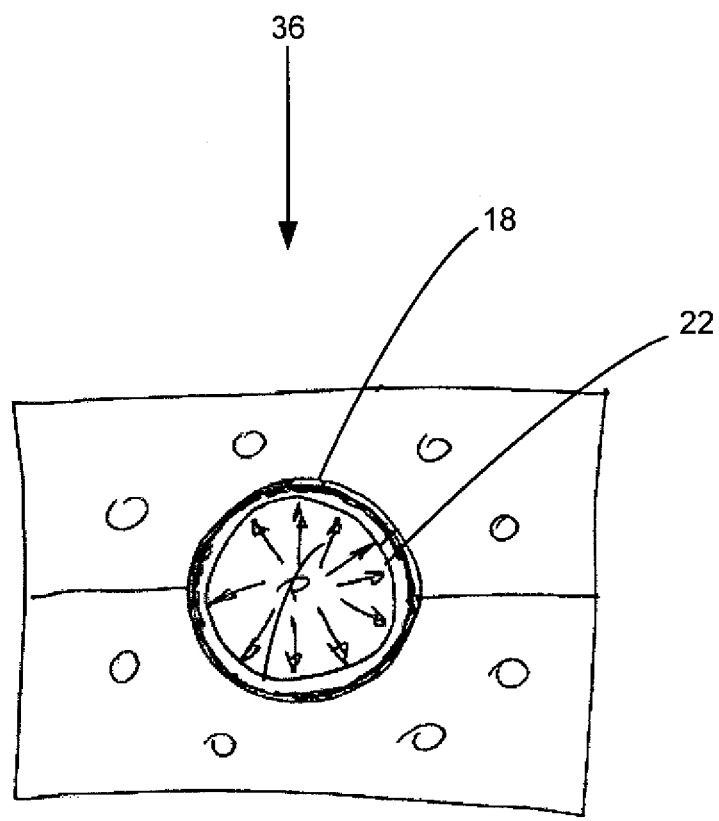
FIG. 8 is a cross-sectional view of a mold for manufacturing the composite part of FIG. 5.

FIG. 8 is now concurrently referred to. During the manufacturing of the composite part 24, both the tube 18 and the film 22 inside it are placed in a cavity of a mold 36. While the temperature of the tube 18 and of the film 22 is risen until the material used for both the matrix 16 and the film 22 reach their material forming temperature (for example 650° F. for polyetherimide), a pressure of approximately 60 psi is applied inside the film 22, which double its function as a pressure bladder during the manufacturing process. This pressure presses the film 22 and the tube 18 against the wall of the cavity. Because both the tube 18 and the film 22 are made from compatible materials, the film 22 bonds to the fiber tape strips 12. If any voids 20 are present in the tube 18, the pressure makes the film 22 fill the voids 20. It will be apparent to a person skilled in the art that for the film 22 to perform as a pressure bladder during the manufacturing of the composite part 24, the film 22 must be closed at one end. Only after the molding operation is the end of the film 22 cut open so as to provide a smooth air flow inside the composite part 24. This method allows light composite part 24, such as the ventilation duct 32 depicted in FIG. 6, to be manufactured.

If a better consolidation or if a higher pressure is required during the molding process, a pressure bladder capable of withstanding higher pressures than the film 22 may be used. The pressure bladder is then placed inside the tube 18 and the film 22. When inflated, the pressure bladder presses both the film 22 and the tube 18 against the cavity of the mold 36.

Figure 9:
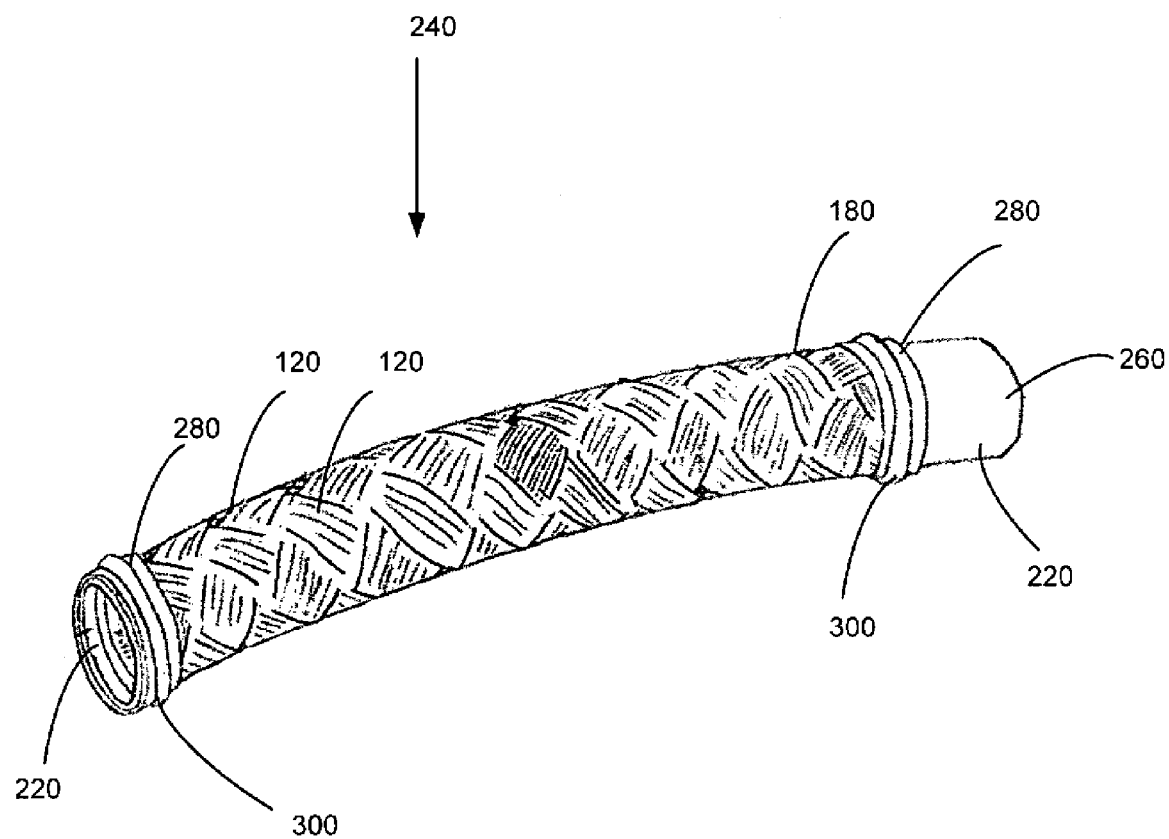
FIG. 9 is an axonometric view of a composite part made from the tube of Figure (braided essentially free of voids)

The film 220 is especially useful when the tube 180 is used to manufacture a composite part 240 having a tubular structure, substantially free of voids, as depicted in FIG. 9, such as a ventilation duct for an aircraft. Since the weight of aircraft components is always of the utmost importance, the composite part 240 may be made of the tube 180. Hence, while braiding the tube 180, it is possible to use just the minimum amount of reinforcement, i.e. the quantity of fiber tape strips 120, in the tube 180 to create the composite part 240 having the required physical properties. The film 220 is used to seal the inside of the composite part 240, such that the composite part 240 may be used as a ventilation duct. An extending portion 260 of the film 220 may extend from the composite part 240. Although not shown in the embodiment of FIG. 9, one extending portion 260 of the film 220 may extend from each extremity of the composite part 240.

The composite part 240 may be equipped with peripheral bands 280 affixed to an exterior of the tube 180 and placed in proximity to the extremities of the tube 180 so that the bands 280 prevent the fiber tape strips 120 from cracking by adhering to them and providing a reinforcement structure that can withstand a radial load. Each band 280 is actually made of another fiber tape strip 120 wrapped around each extremity of the tube 180 and consolidated to the fiber tape strips 120 using heat during the forming process. The bands 280 may further be deformed during the forming process to create beads 300, which are local circumferential bosses running all around each band 28. These beads 280 are a well-known feature of similar tubular parts and are used when connecting one tubular part to another tubular part or, as in the present case, one composite part 240 to and adjacent composite part 240. A connector is typically used to connect one tubular part to the adjacent tubular part. Such connector is typically made of silicon. The composite parts are held together when the connector is stretched over the beads of the two adjacent tubular parts and clamps or tie-wraps are placed behind each bead so the connector is prevented from disconnecting. This way of assembling two tubular composite parts together is well known in the art.

Figure 10:
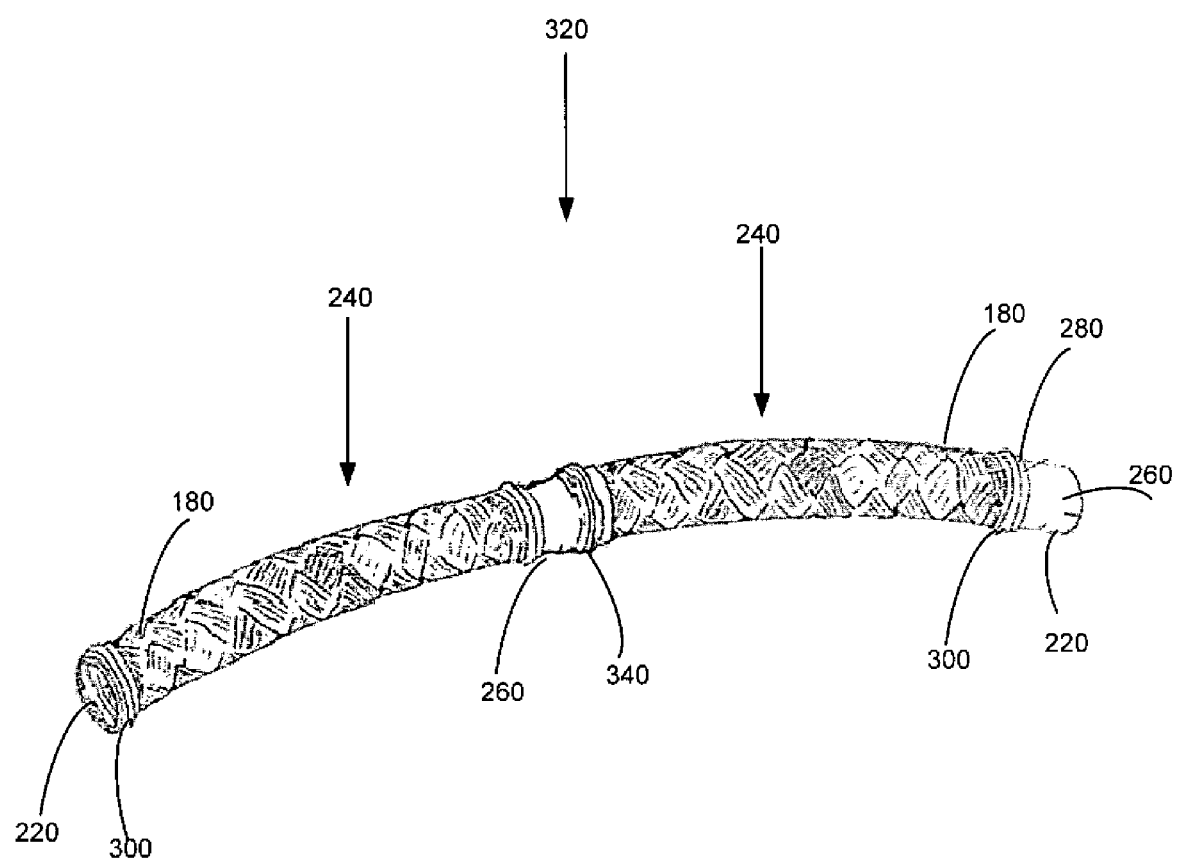
FIG. 10 is an axonometric view of a duct (braided essentially free of voids) made from an assembly of two composite parts of FIG. 9.

FIG. 10, now referred to, depicts a ventilation duct 320 made from the assembly of two composite parts 240 (substantially free of voids). Instead of being assembled with the help of a connector, the two adjacent composite parts 240 are connected together using the extending portion 260 of the film 220. Indeed, the extending portion 260 replaces the known connector by basically acting as a connector that is integrally provided with the composite part 240. The extending portion 300 of the film 220 may be stretched over the bead 280 of the adjacent composite part 240 and locked into place by a clamp or a tie-wrap 340, much in the same fashion a known connector would be locked into place. If the extending portion 300 of the film 220 is not required (for example, if a known connector is used), it may simply be cut flush with the extremity of the composite part 240.

Figure 11:
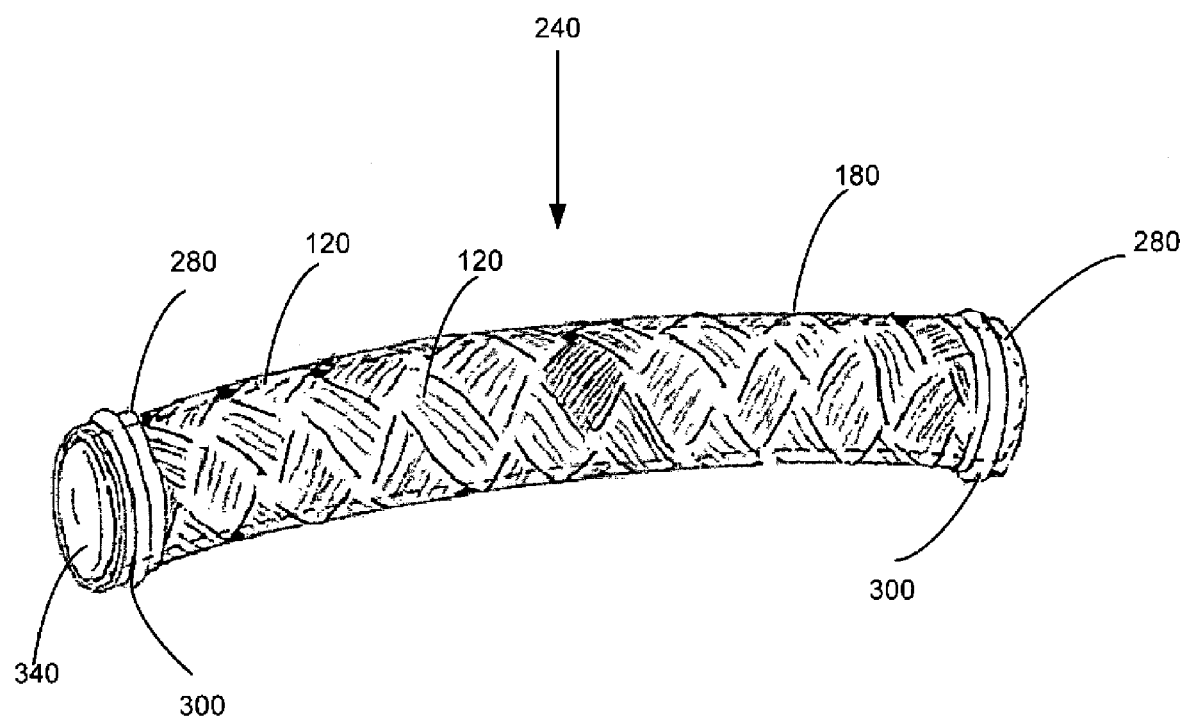
FIG. 11 is an axonometric view of the composite part of FIG. 5 (braided essentially free of voids) showing an inner balloon used during installation of the composite part.

FIG. 11 is now referred to. The composite parts 240 of the present invention (substantially free of voids) are typically installed in aircrafts as ventilation ducts. In such installations, space is scarce and access is cumbersome. Because the composite parts 240 are made as light as possible, it happens that they get damaged during installation because the installers squeezed them too much and they crack. The composite part 240 then becomes useless and must be discarded. To prevent such wasted material, an inner balloon 340 is provided inside the composite part 240 for the installation. The inner balloon 340, inflated to a low pressure, provides sufficient radial support to the fiber tape strips 120 so that they do not deform over their limit when squeezed into place during installation. The inner balloon 340 therefore prevents the fiber tape strips 120 from snapping and breaking when squeezed. Once the composite part 240 is installed in the aircraft, the inner balloon 340 may be deflated and reused or may be burst, removed and discarded. For example, the inner balloon 340 may be cheaply made from two polyethylene films welded together and cut to match the interior shape of the composite part 240. The cutting operation may be done simultaneously to the welding operation.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

The invention claimed is:

1. A composite material comprising:
a plurality of fiber tape strips assembled together so as to form a tube, each of said plurality of fiber tape strips being made of a single layer of unidirectional fibers, said fibers being at least partially embedded in a thermoplastic matrix, wherein said plurality of fiber tape strips are loosely assembled and define a plurality of voids thereinbetween, said tube comprising a thermoplastic film configured to seal the voids between the fiber tape strips, thereby making the tube air-tight.

2. The composite material of claim 1 wherein said film is made of a resin selected from the group consisting of cyanate ester, polyphenylene sulfide, polyetherimide and polyamide.

3. The composite material of claim 1 wherein said fiber is selected from the group consisting of carbon fiber, aramid fiber and glass fiber.

4. The composite material of claim 1 wherein said thermoplastic matrix is made of a resin selected from the group consisting of polyphenylene sulfide, polyetherimide and polyamide or a thermoset matrix made of a resine cyanate ester.

5. The composite material of claim 1 wherein said each of said plurality of fiber tape strips has a width of less than 0.75 inch (19.05 millimeters).

6. A composite part made from a material comprising:
a plurality of fiber tape strips loosely assembled together so as to form a duct, each of said plurality of fiber tape strips being made of a single layer of unidirectional fibers, said fibers being at least partially embedded in a thermoplastic matrix, wherein the fiber tape strips include voids thereinbetween and the duct comprises a thermoplastic film configured to seal the voids, thereby making the duct air-tight.

7. The composite part of claim 6 further comprising a peripheral band attached to on an exterior of said duct, said band being proximate to an extremity of said duct, said band being operative to lock said plurality of fiber tape strips.

8. The composite part of claim 7 further comprising a bead on said peripheral band.

9. The composite part of claim 7 wherein said film extends from said duct.

10. The composite part of claim 7 further comprising an inflated balloon inside said duct, said balloon providing support to said duct.

11. The composite part of claim 7 wherein said film is made of a resin selected from the group consisting of cyanate ester, polyphenylene sulfide, polyetherimide and polyamide.

12. The composite part of claim 6 wherein said fiber is selected from the group consisting of carbon fiber, aramid fiber and glass fiber.

13. The composite part of claim 6 wherein said thermoplastic matrix is made of a resin selected from the group consisting of cyanate ester, polyphenylene sulfide, polyetherimide and polyamide.

14. The composite part of claim 6 wherein said each of said plurality of fiber tape strips has a width of less than 0.75 inch (19.05 millimeters).

15. A method of making an air duct comprising:
loosely assembling together in the form of a duct a plurality of fiber tape strips so as to provide voids thereinbetween, wherein each of said plurality of fiber tape strips comprises a single layer of unidirectional fibers, said fibers being at least partially embedded in a thermoplastic matrix;
sealing the voids between the fiber tape strips using a thermoplastic film, thereby making the duct air-tight.

16. A method of manufacturing a composite part comprising:
pressurizing a film inside a tube made from a plurality of loosely assembled fiber tape strips having voids thereinbetween while heating said tube and said film up to their forming temperature so as to bond said film to said tube and seal the voids between the fiber tape strips, wherein each one of said plurality of fiber tape strips is made of a single layer of unidirectional fibers, said fibers being at least partially embedded in a thermoplastic matrix.

17. The method of claim 16 wherein said heating comprises pressurizing said film with an inflatable bladder.

* * * * *